United States Patent [19]

Grime

[11] 4,295,697
[45] Oct. 20, 1981

[54] ELECTRICAL POWER DISTRIBUTION SYSTEM PRINCIPALLY FOR SPACE-DIVIDING PANELS IN OFFICE BUILDINGS

[75] Inventor: Paul R. Grime, Erie, Mich.

[73] Assignee: Owens-Corning Fiberglas Corporation, Toledo, Ohio

[21] Appl. No.: 117,405

[22] Filed: Jan. 31, 1980

[51] Int. Cl.³ .............................................. H02G 3/28
[52] U.S. Cl. .................................... 339/22 R; 339/65
[58] Field of Search ..................... 339/20, 21 R, 21 S, 339/22 R, 22 B, 22 T, 23, 24, 65, 66 R, 66 M, 66 T, 156–159, 205

[56] References Cited

U.S. PATENT DOCUMENTS

| | | | |
|---|---|---|---|
| 2,673,969 | 3/1954 | Pfister | 339/157 C |
| 3,588,784 | 6/1971 | Kunkle et al. | 339/65 |
| 4,060,294 | 11/1977 | Haworth et al. | 339/22 R X |
| 4,203,639 | 5/1980 | VandenHoek et al. | 339/22 R |
| 4,235,495 | 11/1980 | Propst et al. | 339/22 R |

Primary Examiner—Joseph H. McGlynn
Assistant Examiner—Frank H. McKenzie, Jr.
Attorney, Agent, or Firm—Ronald C. Hudgens; Philip R. Cloutier; Paul J. Rose

[57] ABSTRACT

An electrial power distribution block is secured to the lower portion of the metal frame of each space-dividing panel. The distribution blocks in an assembly of panels are electrically connected together. Wherever access to electical power on either side of a panel is desired, a slide-in duplex receptacle is mounted on the distribution block on that side. The receptacles interlock with the blocks to provide built-in stress relief, without separate mechanical fasteners, against forces generated by plugging into or removing a plug from the receptacle. The terminals of the blocks are recessed and the receptacle terminals which connect with the block terminals are shielded in plastic sleeve portions of the receptacles. The conductors of both the blocks and the receptacles are molded in place.

5 Claims, 14 Drawing Figures

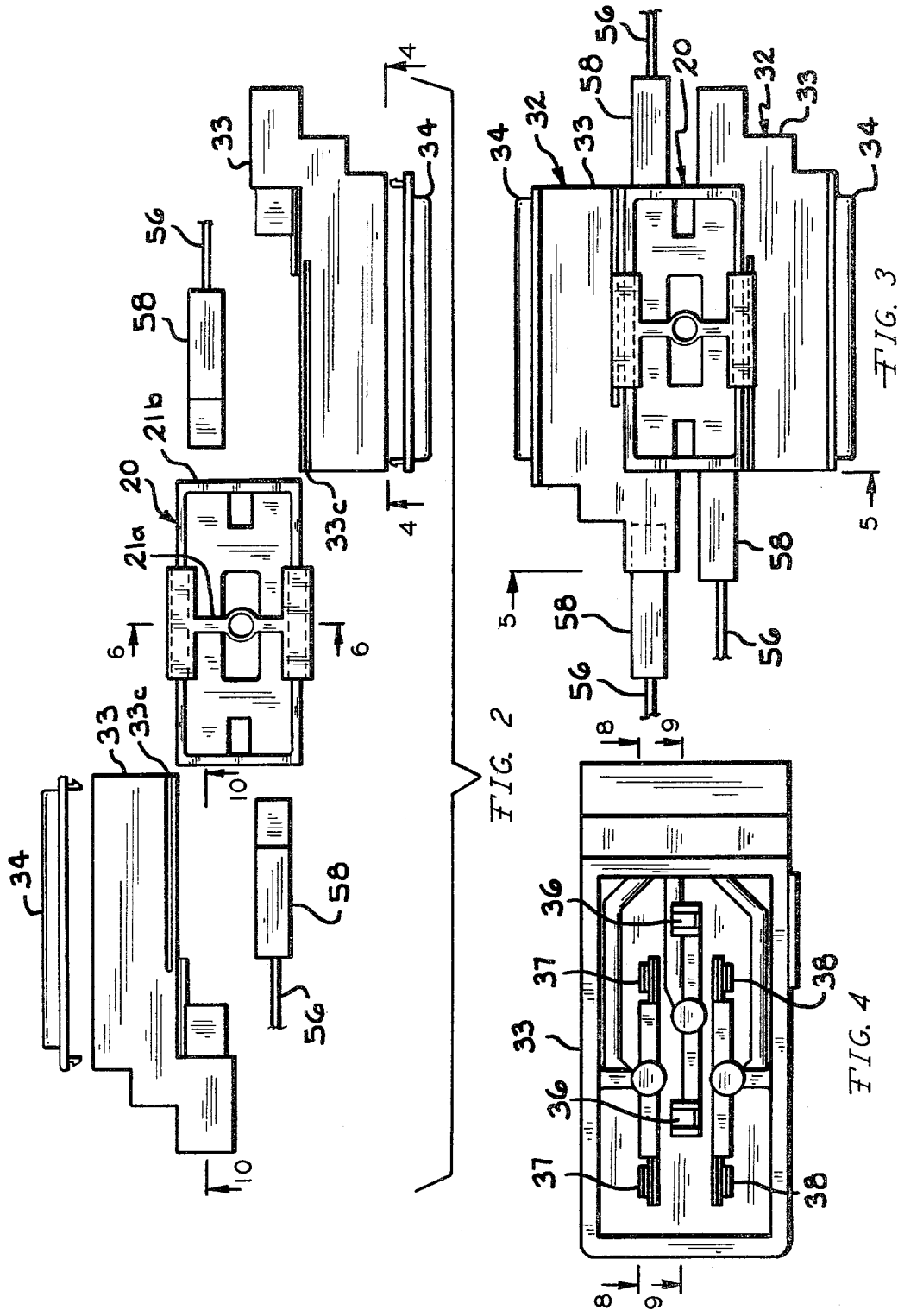

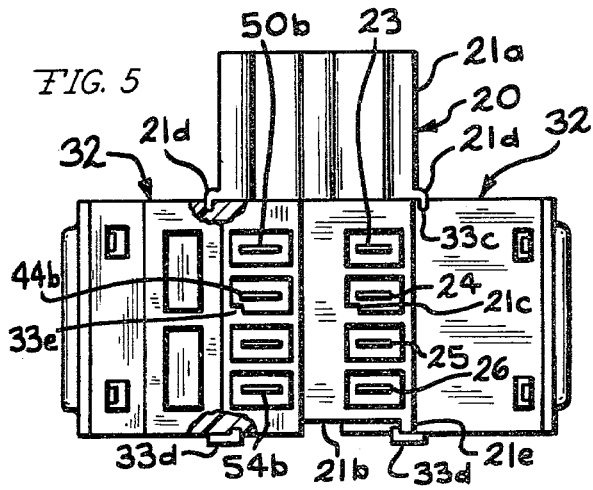
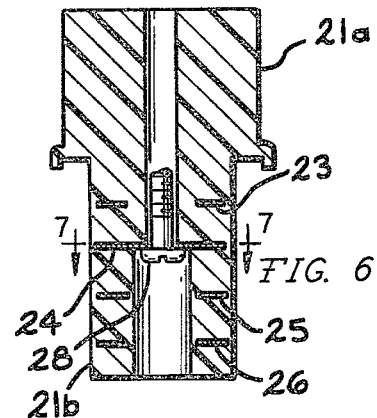
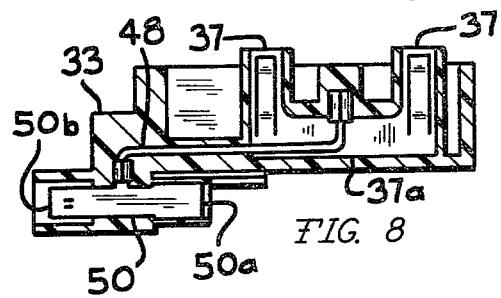
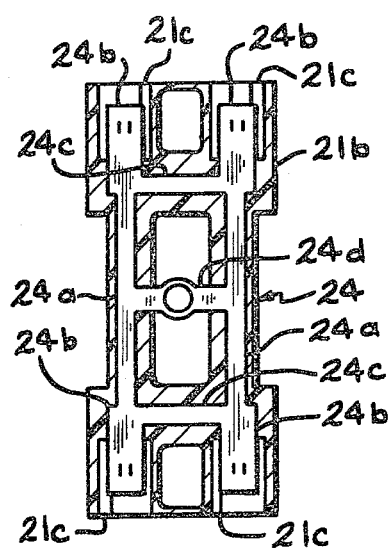
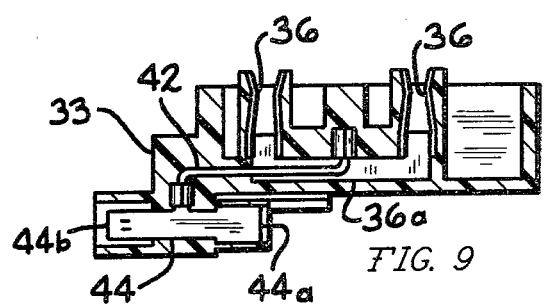
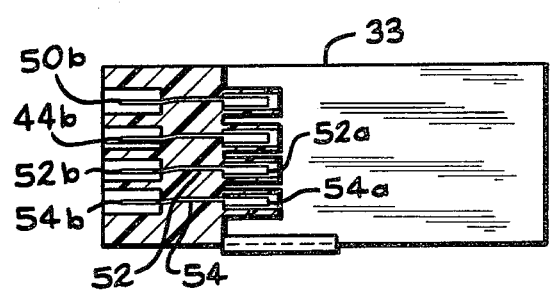
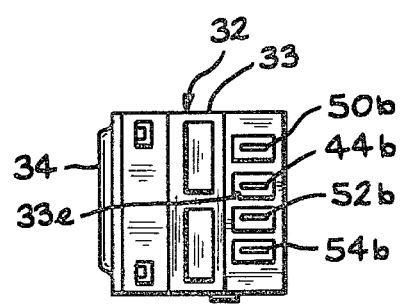

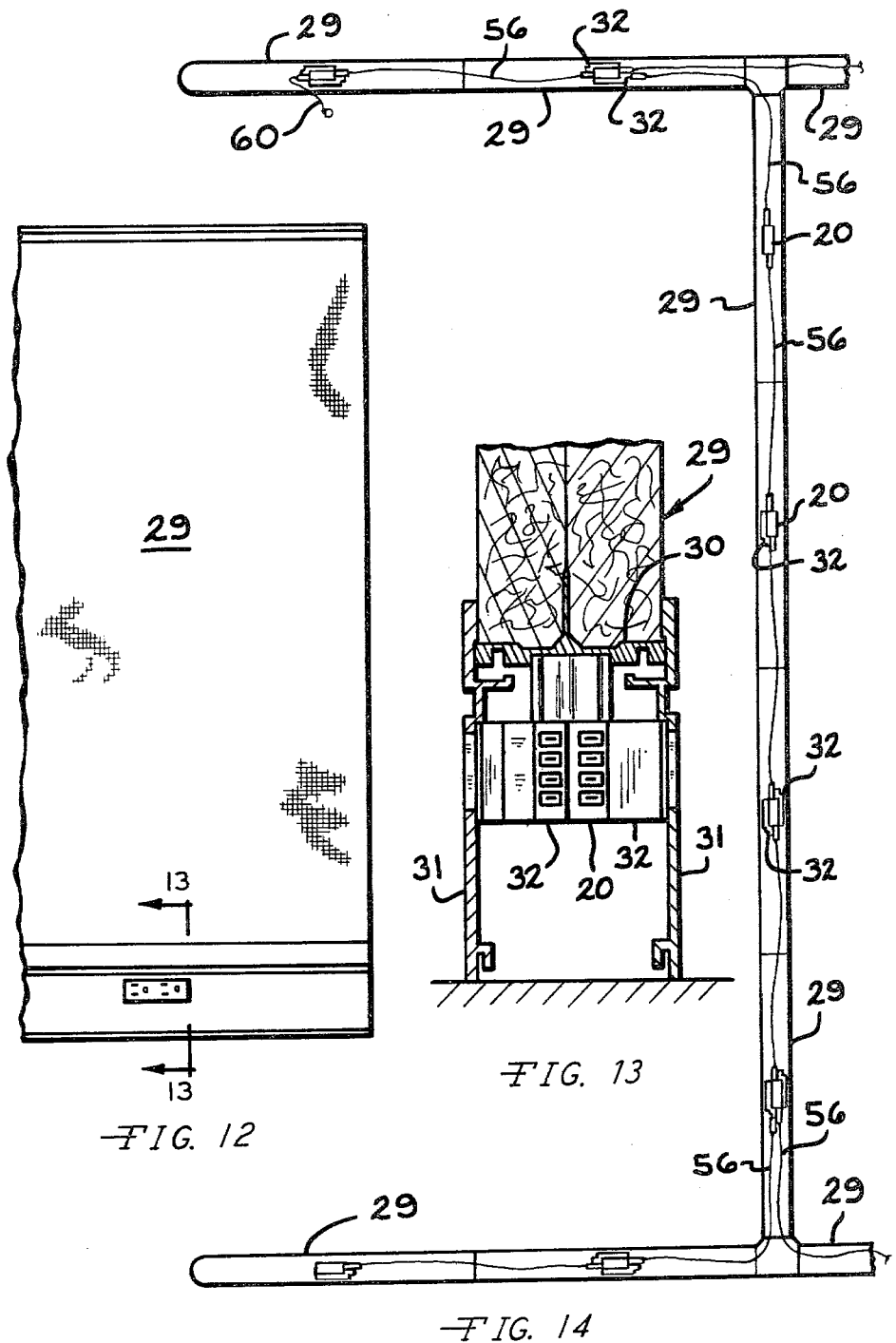

ELECTRICAL POWER DISTRIBUTION SYSTEM PRINCIPALLY FOR SPACE-DIVIDING PANELS IN OFFICE BUILDINGS

TECHNICAL FIELD

This invention relates generally to free-standing decorative acoustical panels for dividing space in office buildings, and more particularly to an electrical power distribution system for use therewith.

BACKGROUND ART

The type of office space-dividing panels for which the electrical power distribution system of this invention is particularly suitable is shown and described in U.S. Pat. No. 4,158,936. Each such panel includes a metal frame around the edges of two fibrous glass boards arranged back-to-back, two supporting legs secured to the bottom of the frame adjacent opposite ends thereof, and two elongated base cover plates removably secured to the supporting legs. The cover plates and the bottom frame portion partially define an electrical raceway.

DISCLOSURE OF THE INVENTION

An electrical power distribution block is secured by one screw to the bottom frame portion of each space-dividing panel between the supporting legs. The distribution block of each panel is electrically connected to those of other panels in an assembly and an electrical power supply is connected to one of the blocks. Wherever access to electrical power is desired on either side of a panel, a slide-in duplex receptacle is mounted on the distribution block of the panel on that side, and the base cover plate is provided with an access aperture.

Both the power distribution blocks and the slide-in duplex receptacles are made of molded plastic with the electrical conductors molded in place and terminal portions recessed, and further, the molded portions of the distribution blocks and receptacles are matched so as to interlock when assembled and provide built-in stress relief, without separate mechanical fasteners, against forces generated by plugging into or removing a plug from the receptacle.

BRIEF DESCRIPTION OF THE DRAWINGS

The details of the invention are set forth in connection with the accompanying drawings in which:

FIG. 2 is an exploded reduced plan view of the articles of FIG. 1;

FIG. 3 is a reduced plan view of the articles of FIG. 2 in assembled relationship;

FIG. 4 is a front view of one of the slide-in duplex receptacles with the cover plate removed, taken in the direction of arrows 4—4 of FIG. 2;

FIG. 5 is an end view of the power distribution blocked with a pair of the slide-in duplex receptacles assembled thereto, taken in the direction of arrows 5—5 of FIG. 3, portions of one of the receptacles being broken away;

FIG. 6 is a vertical sectional view of the power distribution block, taken along the line 6—6 of FIG. 2;

FIG. 7 is a plan sectional view of the power distribution block, taken along the line 7—7 of FIG. 6;

FIG. 8 is a reduced longitudinal sectional view of one of the slide-in duplex receptacles, taken generally along the line 8—8 of FIG. 4;

FIG. 9 is a reduced longitudinal sectional view of one of the slide-in duplex receptacles, taken generally along the line 9—9 of FIG. 4;

FIG. 10 is a reduced sectional view taken generally along the line 10—10 of FIG. 2;

FIG. 11 is a reduced outer end view of one of the slide-in duplex receptacles, showing how the left-hand receptacle of FIG. 5 appears without portions broken away;

FIG. 12 is a reduced fragmentary elevational view of an office space-dividing panel having a distribution power block and a pair of slide-in duplex receptacles constructed in accordance with the invention mounted thereon;

FIG. 13 is a fragmentary sectional view taken generally along the line 13—13 of FIG. 12; and FIG. 14 is a reduced schematic plan view of an assembly of a plurality of space-dividing panels each having a power distribution block constructed in accordance with the invention mounted on the bottom portion of the frame thereof and none, one, or two slide-in duplex receptacles assembled on the distribution block.

BEST MODE FOR CARRYING OUT THE INVENTION

Figure 1:
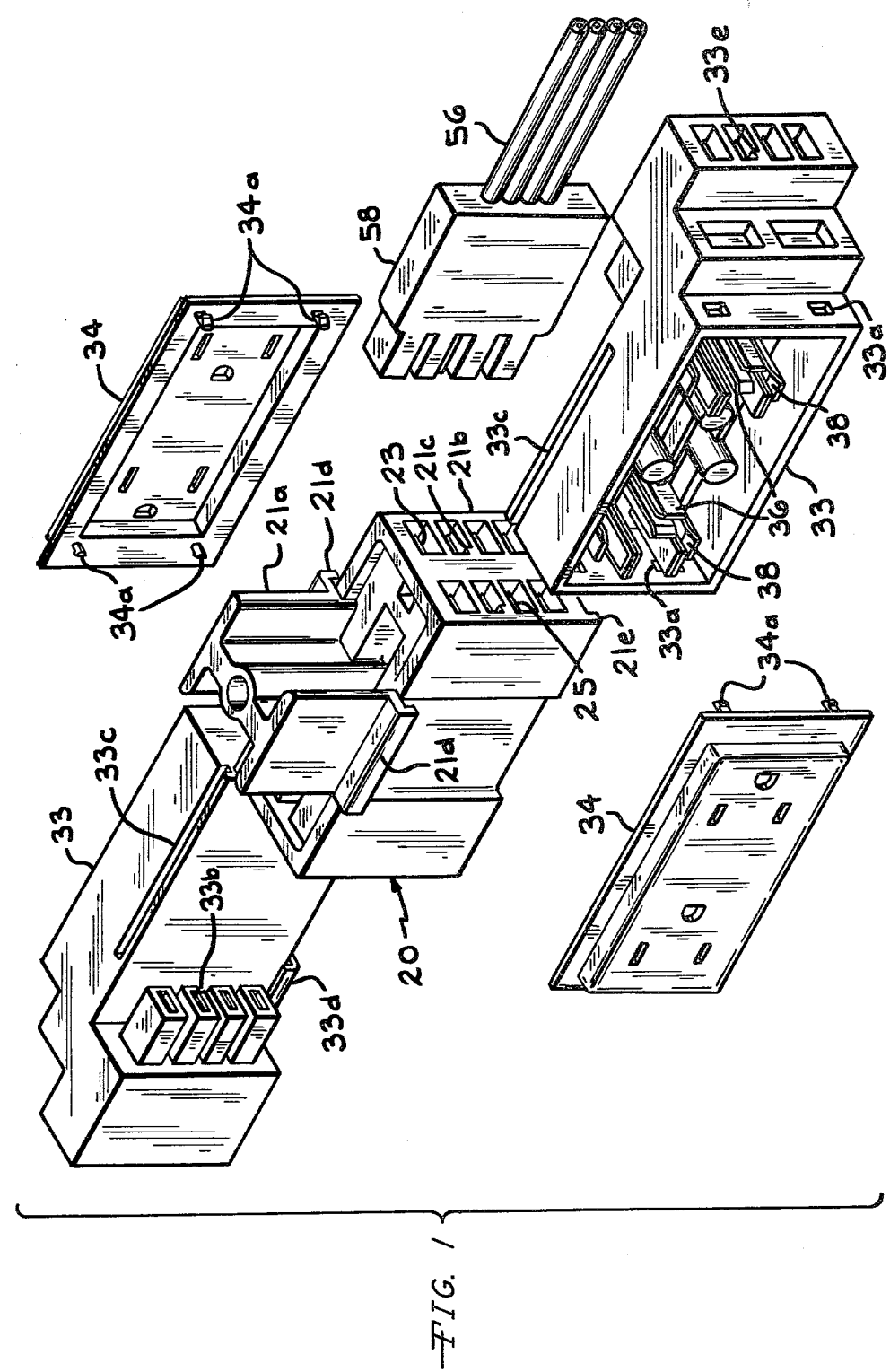
FIG. 1 is a reduced exploded isometric view of a power distribution block and a pair of slide-in duplex receptacles constructed in accordance with the invention, along with a portion of a power distribution cord.

With respect to the drawings, an electrical power distribution block 20 constructed in accordance with the invention is shown in FIGS. 1, 2, 3, and 5. As best shown in FIG. 1, the distribution block 20 includes a generally H-shaped plastic mounting spacer portion 21a molded integrally with a generally rectangular plastic block portion 21b. The block portion 21b is molded around four electrically conductive flat metallic members 23, 24, 25, and 26 shown in FIGS. 5-7. The conductive member 24 (FIG. 7) includes two elongated, parallel, spaced portions 24a each having a pair of male spade terminals 24b respectively at opposite ends. Each terminal 24b of one elongated portion 24a is connected adjacent an inner end to a corresponding terminal 24b of the other elongated portion 24a by a connecting portion 24c. The conductive members 23, 25, and 26 are similarly constructed, except that the conductive member 24 also has an additional apertured central connecting portion 24d connecting the two elongated portions 24a centrally thereof.

The member 24 is the ground for a grounded electrical system. A screw 28 fragmentarily shown in FIG. 6 is used to secure the distribution block 20 to the bottom of the metal frame 30 (FIG. 13) of a space-dividing acoustical panel 29 (FIG. 12). The head of the screw 28 bears against the conductive member 24.

The block portion 21b is provided with eight recesses at each end, as best shown for one end in FIG. 1, for providing access to the terminals of the conductive members 23, 24, 25, and 26, such as the terminals 24b, which are recessed within the block portion.

Two slide-in duplex receptacles 32 constructed in accordance with the invention are shown in FIGS. 1-3. Each receptacle 32 includes a molded plastic casing 33 and a snap-on molded plastic cover 34. Each cover 34 has four rectangularly spaced prongs 34a. As will be understood by those skilled in the art, the prongs 34a are somewhat flexible and have cam surfaces on transversely outwardly enlarged free end portions, the cam surfaces being engageable with an inner edge of the respective casing 33 as the cover 34 is applied, and flexing the prongs 34a inwardly. Further, each casing 33 is provided with a pair of apertures 33a in each of a pair of opposed wall portions, and the enlarged free end portions of the prongs 34a snap into the respective apertures 33a as the cover is assembled to the casing. Thereafter it is very difficult to remove the cover 34 without forced breaking of the prongs 34a.

Each cover 34 is provided with suitable apertures for receiving the prongs of two three-prong electrical plugs. Further, each casing 33 contains suitable female terminals aligned with the apertures in the cover 34 for receiving the prongs of two electrical plugs. Thus, as shown in FIG. 4, each casing 33 contains two female ground terminals 36 for respectively receiving the ground prongs of two electrical plugs, two female power terminals 37 for respectively receiving one power prong of each of the two electrical plugs, and two female power terminals 38 for respectively receiving the other power prong of each of the two electrical plugs.

FIG. 9 shows the two ground terminals 36 formed integrally with a connecting strap 36a molded into the casing 33. A wire 42 is crimped at one end to the strap 36a and at the other end to a blade 44 molded into another portion of the casing 33 and having a female spade terminal 44a at one end and a male spade terminal 44b at the other end.

FIG. 8 shows the two power terminals 37 formed integrally with a connecting strap 37a molded into the casing 33. A wire 48 is crimped at one end to the strap 37a and at the other end to a blade 50 molded into another portion of the casing 33 and having a female spade terminal 50a at one end and a male space terminal 50b at the other end.

The two power terminals 38 are also formed integrally with a connecting strap (not shown) joined by a wire (not shown) to a blade 52 (FIG. 10) having a female spade terminal 52a at one end and a male spade terminal 52b at the other end. A fourth blade 54 having a female spade terminal 54a at one end and a male spade terminal 54b at the other end is molded into the casing 33 to provide a straight current path therethrough and is not electrically connected to anything within the casing.

As will be understood by those skilled in the art, other slide-in duplex receptacles will have a set of the power terminals 37 or 38 electrically connected to the blade 54 and no power terminals connected to the blade 50. Thus the distribution blocks 20 may be part of a 230-volt system and the two different types of construction for the slide-in duplex receptacles will allow balanced 115-volt loads.

The terminals 36, 37, and 38, the connecting straps such as straps 36a and 37a, the wires such as wires 42 and 48, and the blades 44, 50, 52, and 54 are molded in place into the molded plastic casing 33. The male spade terminals 44b, 50b, 52b, and 54b are recessed within the casing 33 and the casing is provided with recesses therearound for providing access thereto. The female spade terminals 44a, 50a, 52a, and 54a are shielded by plastic sleeves integral with the casing 33.

Because of the different constructions of receptacles 32 with respect to which of the power terminals 37 and 38 are connected to the blades 50, 52, and 54, as explained above, provision is made for preventing installation of a receptacle 32 upside down with respect to a distribution block 20, and at the same time for providing interlocking between the distribution block 20 and the receptacle 32 for built-in stress relief against the forces of plugging and unplugging electrical service cords into the receptacle 32. The block portion 21b includes interfering portions 21c (FIGS. 1, 5, and 7) respectively in the recesses for the ground terminals 24b, and the plastic sleeve around the female terminal 44a of each receptacle 32 is correspondingly cut away, as at 33b in FIG. 1, to accommodate the respective interfering portion 21c. If the receptacle is turned upside down with respect to the distribution block 20 and attempted to be assembled therewith, the sleeve around the female terminal 52a would interfere with the respective interfering portion 21c.

Also preventing upside-down assembly and additionally enabling interlocking of the block 20 and a receptacle 32 are L-shaped projections 21d on the mounting spacer portion 21a, a groove 33c on each casing 33 for receiving the free end portion of the respective projection 21d, base leg portions 21e on the block portion 21b, and an L-shaped projection 33d on each receptacle 32 for wrapping around the respective base leg portion 21e. FIGS. 1 and 2 show two receptacles 32 (i.e., casings 33 thereof) about to be assembled with the distribution block 20 and FIG. 3 shows them assembled. FIG. 5 shows how the receptacles 32 interlock with the block 20 to provide built-in stress relief against forces of plugging or unplugging electrical service cords into or out of the receptacles 32, without the necessity of screw-type fastners. The free end portions of the L-shaped projections 21d are received respectively in the grooves 33c and the L-shaped projections 33d are wrapped respectively around two of the base leg portions 21e. The casing 33 also has an interfering portion 33e.

FIG. 1 also shows an electrical cord 56 having a plug 58 which can be plugged into either the distribution block 20 or into an end of a receptacle 32 having the male terminals 44b, 50b, 52b, and 54b. The plug 58 has corresponding female terminals shrouded in plastic sleeves. FIG. 2 shows two of the electrical cords 56 about to be plugged into the block 20, and FIG. 3 shows two cords 56 plugged into the block 20 and one cord 56 plugged into one of the receptacles 32.

FIG. 13 shows one of the distribution blocks 20 installed in a panel 29 along with two of the slide-in duplex receptacles 32. The panel 29 is generally like that disclosed in U.S. Pat. No. 4,158,936, the support legs to which base side panels 31 are secured not being shown herein.

When a cord 56 is used to connect a distribution block 20 in one panel 29 with block 20 in another panel, it has plugs 58 on both ends. FIG. 14 shows a plurality of assembled panels 29 with blocks 20, receptacles 32, and cords 56 schematically shown therein. A distribution block 20 is present in each panel 29, but there may be none, one, or two slide-in duplex receptacles 32 in each panel. A power supply cord 60 for the several panels 29 has a plug 58 on only one end. When the panels 29 are assembled in a T-shape plan, one cord 56 is connected to a distribution block 20 and one may be connected to a receptacle 32 to feed two branches of the T-shape, respectively.

Various modifications may be made in the structure shown and described without departing from the spirit and scope of the invention.

I claim:

1. An electrical power distribution kit comprising an elongated molded plastic electrical power distribution block having electrically conductive members molded therein, the conductive members of the block having terminals accessible respectively from opposite ends of the block, and an elongated molded plastic slide-in duplex receptacle having electrically conductive members molded therein, each of the block and receptacle members having aligning and interlocking means thereon cooperable with aligning and interlocking means on the other, the receptacle being fastenable to the block by sliding the receptacle in the direction of its length along one side of the block in the direction of the length of the block and thereby engaging the cooperable aligning and interlocking means with each other, the receptacle being engaged with a portion of one end of the block and with the one side of the block when fastened thereto, the conductive members of the receptacle having terminals cooperatively engageable respectively with terminals of the conductive members of the block adjacent the one end thereof as the receptacle is fastened to the block by engagement of the cooperable aligning and interlocking means with each other, the terminals of the conductive members of the block being recessed within the block respectively in recesses therein, the terminals of the conductive members of the receptacle respectively being shielded by plastic sleeve portions of the receptacle, the plastic sleeve portions being receivable respectively in recesses of the block as the terminals of the conductive members of the receptacle are cooperatively engaged respectively with terminals of conductive members of the block, the conductive members of the receptacle also having two sets of socket terminals accessible from a front face of the receptacle parallel to the sides of the block when the receptacle and block are assembled, the two sets of socket terminals being spaced longitudinally of the receptacle, and the cooperable aligning and interlocking means being an aligning means when the receptacle is being fastened to the block and an interlocking means when a service cord is being pulled out of one of said sets of socket terminals.

2. An electrical power distribution kit comprising an elongated molded plastic electrical power distribution block having electrically conductive members molded therein, the conductive members of the block having terminals accessible respectively from opposite ends of the block, and an elongated molded plastic slide-in duplex receptacle having electrically conductive members molded therein, each of the block and receptacle members having aligning and interlocking means thereon cooperable with aligning and interlocking means on the other, the receptacle being fastenable to the block by sliding the receptacle in the direction of its length along a side of the block in the direction of the length of the block and thereby engaging the cooperable aligning and interlocking means with each other, the conductive members of the receptacle having terminals cooperatively engageable respectively with terminals of the conductive members of the block adjacent one end thereof as the receptacle is fastened to the block by engagement of the cooperable aligning and interlocking means with each other, the conductive members of the receptacle also having two sets of socket terminals accessible from a front face of the receptacle parallel to the sides of the block when the receptacle and block are assembled, the two sets of socket terminals being spaced longitudinally of the receptacle, and the cooperable aligning and interlocking means being an aligning means when the receptacle is being fastened to the block and an interlocking means when a service cord is being pulled out of one of said sets of socket terminals.

3. An electrical power distribution kit comprising an elongated molded plastic electrical power distribution block having electrically conductive members molded therein, the conductive members of the block having terminals accessible respectively from opposite ends of the block, and an elongated molded plastic slide-in duplex receptacle having electrically conductive members molded therein, the receptacle being engaged with one side of the block and with a portion of one end of the block when assembled therewith, the conductive members of the receptacle having terminals cooperatively engageable respectively with terminals of the conductive members of the block adjacent the one end thereof as the receptacle is assembled with the block by sliding the receptacle in the direction of its length along the one side of the block in the direction of the length of the block, the terminals of the conductive members of the block being recessed within the block respectively in recesses therein, the terminals of the conductive members of the receptacle respectively being shielded by plastic sleeve portions of the receptacle, the plastic sleeve portions being receivable respectively in recesses of the block as the terminals of the conductive members of the receptacle are cooperatively engaged respectively with terminals of conductive members of the block, the conductive members of the receptacle also having two sets of sockets terminals accessible from a front face of the receptacle parallel to the sides of the block when the receptacle and block are assembled, the two sets of socket terminals being spaced longitudinally of the receptacle, and the reception of the plastic sleeve portions of the receptacle in the recesses of the block aiding in interlocking the receptacle with the block against forces generated when a service cord is being pulled out of one of said sets of socket terminals.

4. An electrical power distribution kit as claimed in claim 1, 2, or 3, wherein the conductive members of the receptacle also have additional terminals accessible from an end of the receptacle.

5. An electrifiable acoustical office space-dividing panel comprising an acoustical board, a metal frame around the board, and an electrical power distribution kit as claimed in claim 1, 2, or 3, the electrical power distribution block being secured to a lower portion of the frame intermediately of opposite ends thereof.

* * * * *